US012794021B2

(12) United States Patent
Yan

(10) Patent No.: US 12,794,021 B2
(45) Date of Patent: Nov. 10, 2026

(54) BATTERY CELL AND ELECTRONIC DEVICE

(71) Applicant: Ningde Amperex Technology Limited, Ningde City (CN)

(72) Inventor: Dongyang Yan, Ningde City (CN)

(73) Assignee: Ningde Amperex Technology Limited, Ningde City (CN)

( * ) Notice: Subject to any disclaimer, the term of this patent is extended or adjusted under 35 U.S.C. 154(b) by 886 days.

(21) Appl. No.: 17/886,708

(22) Filed: Aug. 12, 2022

(65) Prior Publication Data

US 2022/0393247 A1 Dec. 8, 2022

Related U.S. Application Data

(63) Continuation of application No. PCT/CN2020/075089, filed on Feb. 13, 2020.

(51) Int. Cl.

*H01M 10/0585* (2010.01)
*H01M 10/0587* (2010.01)
*H01M 50/133* (2021.01)
*H01M 50/178* (2021.01)
*H01M 10/0525* (2010.01)

(52) U.S. Cl.

CPC ... *H01M 10/0585* (2013.01); *H01M 10/0587* (2013.01); *H01M 50/133* (2021.01); *H01M 50/178* (2021.01); *H01M 10/0525* (2013.01)

(58) Field of Classification Search

CPC .......................... H01M 50/178; H01M 50/105
See application file for complete search history.

(56) References Cited

U.S. PATENT DOCUMENTS 5,827,621 A 10/1998 Morishita et al.
2002/0055047 A1 * 5/2002 Satoh .................... H01M 4/133 429/231.95

(Continued)

FOREIGN PATENT DOCUMENTS

CN 103392246 A 11/2013
CN 104835925 A 8/2015

(Continued)

OTHER PUBLICATIONS

Extended European Search Report issued on Feb. 20, 2023, in corresponding European Application No. 20919351.5, 6 pages.

(Continued)

*Primary Examiner* — Barbara L Gilliam
(74) *Attorney, Agent, or Firm* — Maier & Maier, PLLC

(57) ABSTRACT

A battery cell includes an electrode assembly and a housing. A thickness of the electrode assembly is T1 mm. The housing includes a first surface; a second surface at a distance T2 mm from the first surface; a first lateral edge with arc shape and connected to the second surface and possessing a radius of R mm; a third surface connected to the first lateral edge; and a second lateral edge including a first part extending away from the electrode assembly by starting from a first edge of the first surface and a second edge of the third surface, and a second part extending toward the electrode assembly and possessing an ending edge connected to the third surface. Along the thickness direction, a distance between the second edge of the third surface and the ending edge is Z mm, and $(T2-Z)/2 \leq R \leq T1/2+0.3$.

20 Claims, 3 Drawing Sheets

(56) References Cited

U.S. PATENT DOCUMENTS

| | | | | |
|---|---|---|---|---|
| 2011/0091764 | A1 * | 4/2011 | Kim | H01M 50/105 429/163 |
| 2015/0118543 | A1 | 4/2015 | Kim et al. | |
| 2019/0273237 | A1 * | 9/2019 | Kawai | H01M 4/13 |
| 2021/0126305 | A1 | 4/2021 | Zhang et al. | |

FOREIGN PATENT DOCUMENTS

| | | | |
|---|---|---|---|
| CN | 205122651 | U | 3/2016 |
| CN | 110350112 | A | 10/2019 |
| CN | 210040267 | U | 2/2020 |
| EP | 3561897 | A1 | 10/2019 |
| JP | 2001325925 | A * | 11/2001 |
| JP | 2007200824 | A | 8/2007 |
| JP | 2013157286 | A | 8/2013 |
| KR | 1020110041071 | A | 4/2011 |

OTHER PUBLICATIONS

Notice of Allowance issued on Oct. 3, 2023, in corresponding Japanese Application No. 2022-548490, 5 pages.

Notice of Allowance issued on Aug. 3, 2022, in connection with corresponding Chinese Application No. 202080029994.3; 5 pages.

International Search Report (with English Translation) and Written Opinion (with Machine Translation) issued on Nov. 18, 2020 in corresponding International Patent Application No. PCT/CN2020/075089; 14 pages.

* cited by examiner

BATTERY CELL AND ELECTRONIC DEVICE

CROSS-REFERENCE TO RELATED APPLICATION

The present application is a continuation application of a PCT application Serial No. PCT/CN2020/075089, filed on Feb. 13, 2020, the content of which is incorporated by reference in its entirety.

TECHNICAL FIELD

This application relates to the field of batteries, and in particular, to a battery cell and an electronic device.

BACKGROUND

As a type of environmentally friendly secondary battery, lithium-ion batteries have been widely used in fields such as mobile phones, cameras, and notebook computers. Requirements on an energy density and safety performance of the lithium-ion batteries are increasingly higher in the market. Many technical problems remain to be solved urgently in the industry as to how to ensure that a lithium-ion battery achieves high safety performance in addition to a relatively high energy density.

Therefore, a battery cell of both a high energy density and high safety performance needs to be designed.

SUMMARY

One of objectives of this application is to provide a battery cell and an electronic device to improve safety performance and an energy density of the battery cell and the electronic device by specially designing structures of an electrode assembly and a housing.

An embodiment of this application provides a battery cell including: an electrode assembly and a housing. A thickness of the electrode assembly in a thickness direction of the battery cell is T1 mm. The housing is configured to accommodate the electrode assembly. The housing includes: a first surface; a second surface opposite to the first surface, where a distance between the first surface and the second surface in the thickness direction is T2 mm; a first lateral edge with arc shape and connected to the second surface, where a radius of the first lateral edge is R mm; a third surface connected to the first lateral edge and configured to enclose at least a part of a lateral face of the electrode assembly; and a second lateral edge including a first part and a second part. The first part extends away from the electrode assembly by starting from a first edge of the first surface and a second edge of the third surface. The second part extends toward the electrode assembly. The second part possesses an ending edge. The ending edge is connected to the third surface. Along the thickness direction, a distance between the second edge of the third surface and the ending edge is Z mm, and $(T2-Z)/2 \le R \le T1/2+0.3$.

Along a width direction of the battery cell perpendicular to the thickness direction, a maximum distance between the second lateral edge and the electrode assembly close to the second lateral edge is D mm, and $0.3<D<0.9$.

In some embodiments of this application, the first lateral edge defines a sectoral region S with a radius being R mm. Along the thickness direction, a height between the second edge of the third surface and a lowest position of the sectoral region S in the thickness direction is H mm, and $Z \le H$.

In some embodiments of this application, $Z<0.8T2$.

In some embodiments of this application, $0.2T2<Z$.

In some embodiments of this application, $0<T2-T1<0.2$.

In some embodiments of this application, the second lateral edge is a once-bent structure or a twice-bent structure. The second lateral edge fits the third surface hermetically.

In some embodiments of this application, the electrode assembly is formed by winding a first electrode plate and a second electrode plate that are separated from each other. A separator is disposed between the first electrode plate and the second electrode plate.

In some embodiments of this application, the battery cell further includes an electrolytic solution located in the housing.

Another embodiment of this application provides an electronic device. The electronic device includes the battery cell according to any one of the foregoing embodiments.

The battery cell and the electronic device according to the embodiments of this application improve the safety performance and energy density of the battery cell and the electronic device by specially designing structures of the electrode assembly and the housing.

Additional aspects and advantages of the embodiments of this application will be partly described or illustrated later herein or expounded through implementation of the embodiments of this application.

BRIEF DESCRIPTION OF DRAWINGS

For ease of describing the embodiments of this application, the following outlines the drawings necessary for describing the embodiments of this application or the prior art. Evidently, the drawings outlined below are merely a part of embodiments in this application. A person skilled in the art can still obtain the drawings of other embodiments according to the structures illustrated in these drawings.

DETAILED DESCRIPTION OF EMBODIMENTS

Figure 1:
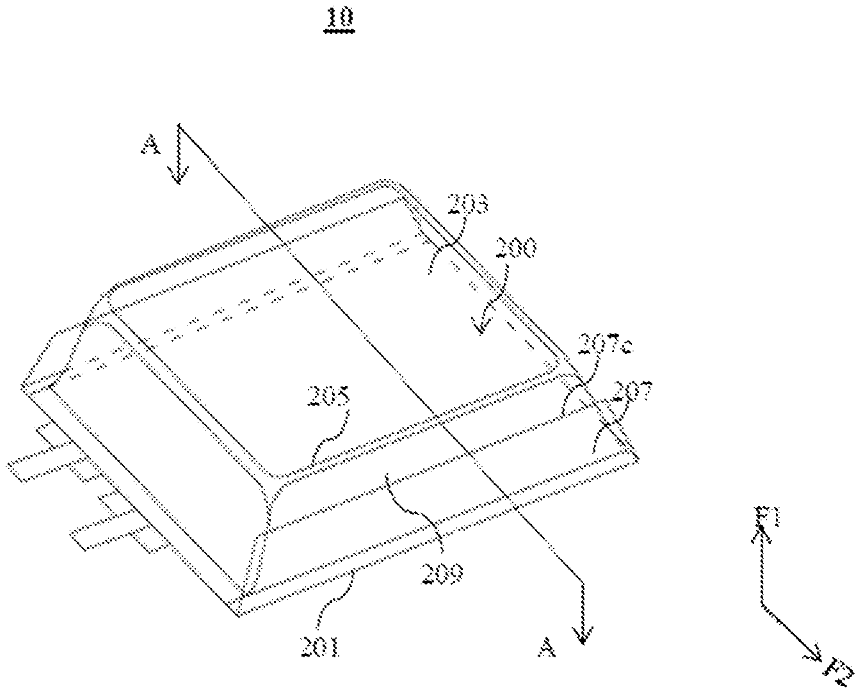
FIG. 1 is a schematic structural diagram of a battery cell according to an embodiment of this application.

Embodiments of this application will be described in detail below. Throughout the specification of this application, the same or similar components and the components having the same or similar functions are denoted by similar reference numerals. The embodiments described herein with reference to the drawings are illustrative and graphical in nature, and are intended to enable a basic understanding of this application. The embodiments of this application are not to be construed as a limitation on this application.

In this specification, unless otherwise specified or defined, relative terms such as “central”, “longitudinal”, “lateral”, “front”, “rear”, “right”, “left”, “internal”, “external”, “lower”, “higher”, “horizontal”, “perpendicular”, “higher than”, “lower than”, “above”, “under”, “top”, “bottom”, and derivative terms thereof (such as “horizontally”, “downward”, “upward”) are intended to be construed as a direction described in the context or a direction illustrated in the drawings. Such relative terms are merely used for ease of description, but not intended to require a construction or operation in this application to be performed in a given direction.

The terms “about”, “roughly”, “substantially”, “substantively”, and “approximately” used herein are intended to describe and represent small differences. When used together with an event or situation, such terms may represent an example in which an event or situation occurs exactly or an example in which an event or situation occurs very approximately. For example, when used together with a numerical value, such a term may represent a variation range falling within ±10% of the numerical value, such as ±5%, ±4%, ±3%, ±2%, ±1%, ±0.5%, ±0.1%, or ±0.05% of the numerical value. For example, if a difference between two numerical values falls within ±10% (such as ±5%, ±4%, ±3%, ±2%, ±1%, ±0.5%, ±0.1%, or ±0.05%) of an average of the numerical values, the two numerical values may be considered “substantially” the same and “approximate to each other”.

Furthermore, for ease of description, “first”, “second”, “third”, and the like may be used herein to distinguish between different components in one drawing or a series of drawings. “First”, “second”, “third”, and the like are not intended to describe corresponding components.

In this application, unless otherwise expressly specified or defined, the terms “dispose”, “connect”, “couple”, “fix”, and similar terms are used in a broad sense, and a person skilled in the art understands that, as the case may be, such terms may be construed as, for example, fixedly connecting, detachably connecting, or integrally connecting; or mechanically connecting or electrically connecting; or directly connecting or indirectly connecting through an intermediary structure; or internal communication between two components.

An energy density and safety performance of a lithium-ion battery are two important indicators of performance of the lithium-ion battery. An existing pouch-type lithium-ion battery is usually packaged with an aluminum plastic film. After completion of the packaging, the lithium-ion battery needs to undergo many types of safety tests such as a drop test, a tumbling test, and a high-temperature and high-humidity test. However, after undergoing the safety test, existing lithium-ion batteries are prone to various problems such as aluminum plastic film breakage, packaging failure, unfolded edge, and electrolyte leakage, thereby reducing a product yield of the lithium-ion batteries and leading to many safety hazards of the lithium-ion batteries. To improve such undesirable phenomena, the prior art usually uses an aluminum plastic film thicker than an ordinary aluminum plastic film for packaging, or increases the dosage of adhesive to achieve a firmer aluminum plastic film package, with a view to improving the safety performance of lithium-ion batteries. However, such solutions not only reduce the energy density of the lithium-ion batteries, but also increase the production cost of the lithium-ion batteries, with the actual technical effects being unsatisfactory.

In view of the above situation, this application provides a battery cell and an electronic device to equally distribute a force borne by an electrode assembly and reduce damage to the electrode assembly caused by the housing by specially designing structures of the electrode assembly and the housing. In addition, this design improves space efficiency of lateral faces of the electrode assembly and the housing and avoids breakage or failure at a sealing position of lateral edges of the housing during a safety test or practical use of the battery cell. Therefore, the battery cell and electronic device according to this application not only achieve higher safety performance, but also achieve a higher energy density. The battery cell and electronic device according to this application will be described in detail below.

Figure 2A:
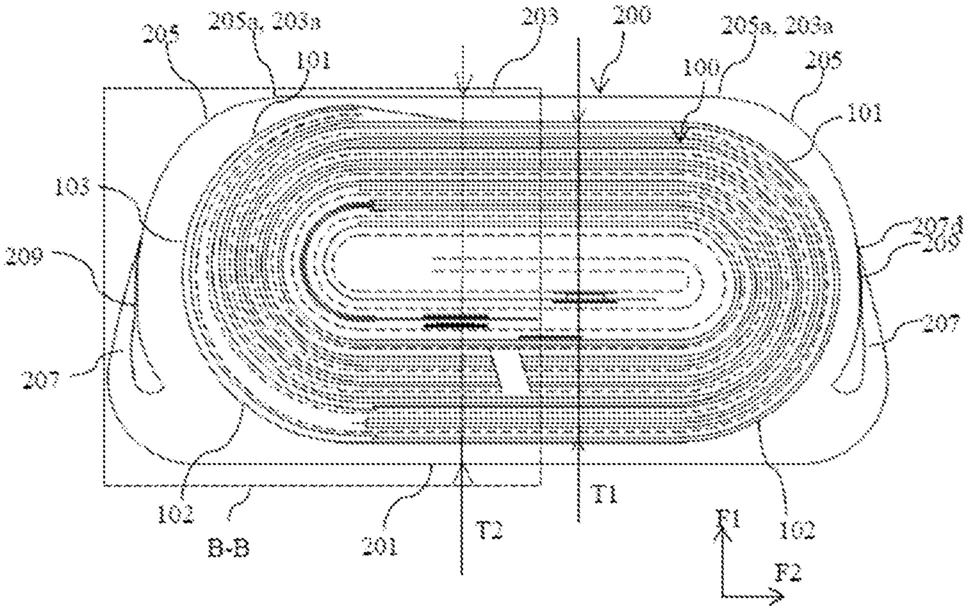
FIG. 2A is a schematic sectional view of the battery cell shown in FIG. 1 and sectioned along an A-A line.
Figure 2B:
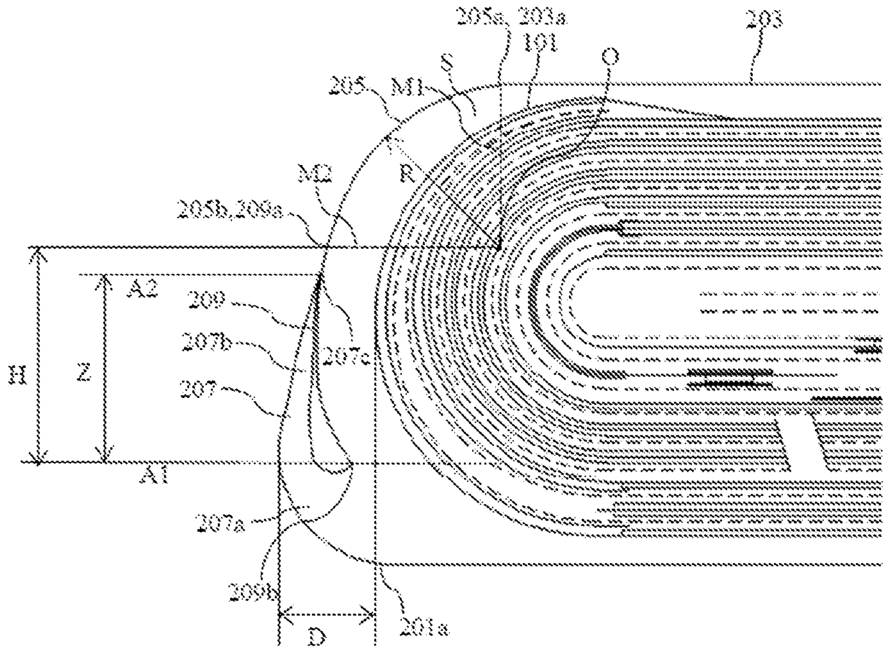
FIG. 2B is a schematic close-up view of the battery cell shown in FIG. 2A and partitioned along a B-B line.

FIG. 1 is a three-dimensional schematic diagram of a battery cell 10 according to an embodiment of this application. FIG. 2A is a schematic sectional view of the battery cell 10 shown in FIG. 1 and sectioned along an A-A line. FIG. 2B is a schematic close-up view of the battery cell 10 shown in FIG. 2A and partitioned along a B-B line. As shown in FIG. 1, FIG. 2A, and FIG. 2B, a battery cell 10 according to an embodiment of this application includes: an electrode assembly 100 and a housing 200.

The electrode assembly 100 possesses a thickness direction F1 extending along a thickness of the battery cell 10, and a width direction F2 perpendicular to the thickness direction F1 and extending along a width of the battery cell 10. A thickness of the electrode assembly in the thickness direction F1 is T1 mm. The electrode assembly 100 is formed by winding a first electrode plate and a second electrode plate that are separated from each other (not shown). A separator (not shown) is disposed between the first electrode plate and the second electrode plate. The first electrode plate is a positive electrode plate, and the second electrode plate is a negative electrode plate. In other embodiments of this application, the electrode assembly 100 includes any number of electrode plates of any polarity. The electrode assembly 100 includes a first edge 101 and a second edge 102 connected to the first edge 101. The electrode assembly 100 is formed by winding the electrode plates. Therefore, both the first edge 101 and the second edge 102 are arc-shaped, and a radius of the first edge 101 and a radius of the second edge 102 may be approximately equal to ½T1 mm. The first edge 101 and the second edge 102 together constitute a lateral face 103 of the electrode assembly 100. The housing 200 is configured to interiorly accommodate the electrode assembly 100. The housing 200 may be made of an aluminum plastic film. In other embodiments of this application, the housing 200 is made of any appropriate packaging material of a pouch-type cell commonly used in the art. The housing 200 possesses a thickness T2 in the thickness direction F1. In this embodiment of this application, a range of a difference between the thickness T2 of the housing 200 and the thickness T1 of the electrode assembly 100 is set to fall within $0<T2-T1<0.2$, so as to shorten a distance between the housing 200 and the electrode assembly 100 along the second direction F2, and in turn, further improve space efficiency of the battery cell 10.

In order to improve the energy density of the battery cell 10, the distance between the battery housing 200 and the electrode assembly 100 needs to be as short as practicable. If the difference between T2 and T1 is excessive, it means that the distance between the housing 200 and the electrode assembly 100 is relatively long, assuming that the thickness of the housing material such as an aluminum plastic film remains the same. Therefore, when the battery cell 10 shakes during use or testing, the electrode assembly 100 is prone to shake in the housing 200, thereby making the battery cell 10 prone to damage after working for a long time or undergoing a safety test, and in turn, reducing reliability of the battery cell 10. Many experiments show that when the difference between T2 and T1 exceeds 0.2 mm, the safety performance of the battery cell 10 deteriorates significantly. Therefore, by setting the difference to fall within $0<T2-T1<0.2$ in this embodiment of this application, the distance between the housing 200 and the electrode assembly 100 along the thickness direction F1 is shortened, thereby enhancing the space efficiency of the battery cell 10, and in turn, ensuring high safety performance of the battery cell 10 on the basis of increasing the energy density of the battery cell 10.

The housing 200 includes a first surface 201, a second surface 203, a first lateral edge 205, a second lateral edge 207, and a third surface 209.

The first surface 201 is opposite to the second surface 203. The first surface 201 and the second surface 203 are flat faces. In other embodiments of this application, the first surface 201 and the second surface 203 may be curved surfaces, or include both a flat face and a curved surface. The first surface 201 includes a first edge 201*a*. The second surface 203 includes a first edge 203*a*.

The first lateral edge 205 is arc-shaped, and includes a start end 205*a* and a finish end 205*b*. The start end 205*a* is connected to the first edge 203*a* of the second surface 203. The finish end 205*b* is connected to the third surface 209. The first lateral edge 205 connects the second surface 203 and the third surface 209. The first side edge 205 is formed by pit-punching, and includes an arc radius R and a circle center O. A first boundary line M1 is defined by a straight line that connects the start end 205*a* of the first lateral edge 205 to the circle center O, and a second boundary line M2 is defined by a straight line that connects the finish end 205*b* of the first lateral edge 205 to the circle center O. A region enclosed by the first boundary line M1, the second boundary line M2, the first lateral edge 205, and the circle center O is defined as the sectoral region S.

The third surface 209 includes a first edge 209*a* and a second edge 209*b*. The first edge 209*a* of the third surface 209 is connected to the finish end 205*b* of the first lateral edge 205. The second edge 209*b* of the third surface 209 is connected to the second lateral edge 207. The third surface 209 is configured to enclose at least a part of a lateral face 103 of the electrode assembly 100. The third surface 209 is planar after the housing 200 is formed by pit-punching. After the electrode assembly 100 formed by winding is put together with an electrolytic solution into the housing 200, the third surface 209 is slightly curved due to the arc shape of the electrode assembly 100 and the filling with the electrolytic solution.

The second lateral edge 207 includes a first part 207*a* and a second part 207*b*. The first part 207*a* extends away from the electrode assembly 100 by starting from the first edge 201*a* of the first surface 201 and the second edge 209*b* of the third surface 209. The second part 207*b* extends toward the electrode assembly 100. The second part 207*b* possesses an ending edge 207*c*. At least apart of the second part 207*b* that includes the ending edge 207*c* is connected to the third surface 209. At least a part of the second part 207*b* of the second lateral edge 207 may be fitted to the third surface 209 by adhesive. In other embodiments of this application, at least a part of the second part 207*b* of the second lateral edge 207 may be fitted to the third surface 209 in any appropriate manner. An ending 207*d* of the second lateral edge 207 is sealed by thermal bonding or adhesive or other means commonly used in the art. Along the thickness direction F1, a plane A1 in which the second edge 209*b* of the third surface 209 is located in the thickness direction F1 is at a dimension Z mm apart from a plane A2 in which the ending edge 207*c* is located in the thickness direction F1, and $0.2T2<Z<0.8T2$. The dimension Z may be understood as a projection length of the second part 207*b* of the second lateral edge 207 in the thickness direction F1.

In this embodiment of this application, the dimension Z is set to be not greater than the thickness T2 of the housing 200, and not greater than the height H of the sectoral region S of the first lateral edge 205 in the thickness direction F1. The height H is measured, along the thickness direction F1, from the plane A1 in which the second edge 209*b* of the third surface 209 is located in the thickness direction F1, to a lowest position of the sectoral region S in the thickness direction F1. In the battery cell 10, the second lateral edge 207 needs to closely fit the third surface 209 of the housing 200. If the second lateral edge 207 does not closely fit the housing 200, the second lateral edge 207 is prone to detach from the first lateral edge 205 or flare out, thereby deteriorating the safety performance of the battery cell 10. The projection length Z of the second lateral edge 207 in the thickness direction F1 is greater than the height H or greater than the thickness T2 of the housing 200, making the second part 207*b* touch the first lateral edge 205 when the second lateral edge 207 is closely fitted to the housing 200. Therefore, it is necessary to ensure that the second part 207*b* touching the first lateral edge 205 is also closely fitted to the first lateral edge 205. However, due to a relatively large curvature of the first lateral edge 205, the second lateral edge 207 can hardly be closely fitted to the first lateral edge 205 in an actual manufacturing process. Moreover, even if the second lateral edge 207 is closely fitted to the first lateral edge 205 successfully, the second lateral edge 207 is prone to detach from the first lateral edge 205 flare out due to loose fitting during the practical use of the battery cell 10. Further, the detached or flared second lateral edge 207 is more prone to abrade the housing 200 under an external force, thereby deteriorating the safety performance of the battery cell 10. If Z is set to be equal to 0.1T2, or 0.9T2, or 0.85T2, it is found that the safety performance of the battery cell 10 is significantly deteriorated. In this embodiment of this application, by setting the range of the dimension Z to be $0.2T2<Z$, it is ensured that the second lateral edge 207 is within an effective sealing range. By setting the range of the dimension Z to be $Z<0.8T2$, it is ensured that the battery cell 10 is superior in safety performance, and the second lateral edge 207 is enabled to closely fit the third surface 209 of the housing 200. Because the third surface 209 is just slightly curved, close fitting between the second lateral edge 207 and the third surface 209 can be easily implemented. In this way, the second lateral edge 207 is not prone to detach from the third surface 209 of the housing 200, thereby reducing the chance of flaring out the second lateral edge 207 during a safety test or practical use of the battery cell 10, where the flaring causes breakage or failure of the housing 200.

A maximum distance in a width direction F2 between the second lateral edge 207 and the electrode assembly 100 close to the second lateral edge 207 is D mm, and $0.3<D<0.9$. By setting the maximum distance D, this embodiment of this application can shorten the distance between the second lateral edge 207 and the electrode assembly 100 in the width direction F2, so as to further improve the space efficiency of the battery cell 10 in the width direction F2. In addition, shortening the distance between the second lateral edge 207 and the electrode assembly 100 helps the second lateral edge 207 to closely fit the third surface 209 of the housing 200, thereby reducing hazards of flaring out of the second lateral edge 207 after a long working period or a safety test of the battery cell 10.

The range of the radius R of the first lateral edge 205 is $(T2-Z)/2 \le R \le T1/2+0.3$. By setting the value of the radius R to fall within $(T2-Z)/2 \le R \le T1/2+0.3$, this embodiment of this application enables the battery cell 10 to be not only space-efficient, but also superior in safety performance. In this embodiment of this application, the radius R of the first lateral edge 205 is designed to match a radian of the first edge 101 of the electrode assembly 100 as far as practicable.

Because the first edge 101 of the electrode assembly 100 is an arc equal to ¼ of a circular structure, the value of R may be set to be equal to T1/2. However, many experiments show that it is appropriate to set the value of R to be R≤T1/2+0.3, in which 0.3 is an empirical correction value. When Z is set to be equal to T1/2+0.4, it is found that the safety performance of the battery cell 10 is significantly deteriorated. In addition, if R is greater than T1/2, the space efficiency of the battery cell 10 will decline, thereby reducing the energy density of the battery cell 10. If R is equal to 0, the first lateral edge 205 is a right-angle structure, and therefore, the space efficiency of the battery cell 10 also declines. In this embodiment of this application, by setting R to be greater than or equal to (T2−Z)/2, the height of the second lateral edge 207 of the battery cell 10 is prevented from exceeding the lowest position of the sectoral region S in the thickness direction F1, so as to prevent the first lateral edge 205 from abrading the housing 200.

The battery cell 10 further includes an electrolytic solution located in the housing 200.

In this embodiment of this application, the projection dimension Z of the second lateral edge 207 of the housing 200 in the thickness direction, the radius R of the first lateral edge 205, and the maximum distance D between the second lateral edge 207 and the electrode assembly 100 are so designed to ensure higher space efficiency of the battery cell 10, so as to increase the energy density of the battery cell 10, make the second lateral edge 207 of the battery cell 10 not prone to detach from the housing 200, and reduce hazards of abrading the housing 200 caused by flaring of the second lateral edge 207.

Figure 3:
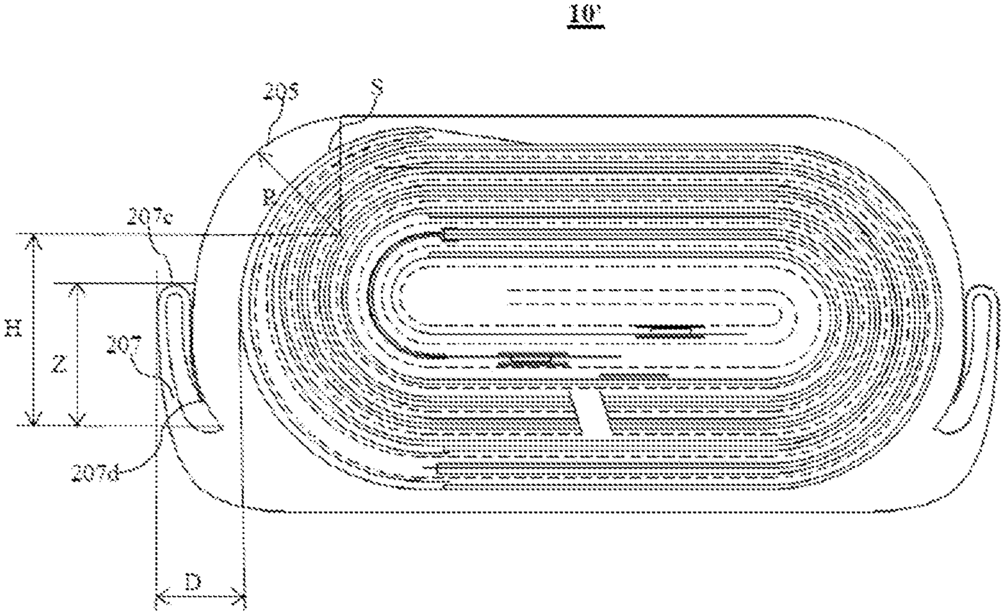
FIG. 3 is a schematic sectional view of a battery cell according to another embodiment of this application.

FIG. 3 is a schematic sectional view of a battery cell 10' according to another embodiment of this application.

The battery cell 10' shown in FIG. 3 differs from the battery cell 10 shown in FIG. 1 only in that the second lateral edge 207 is a twice-bent structure that has been bent twice.

The applicant has carried out the following tests on the battery cells according to various embodiments of this application. Ten different embodiments according to this application and a comparative embodiment according to the prior art are provided below. In each embodiment, 15 battery cells of the same model and same dimensions are tested. The 15 battery cells of the same model and same dimensions are divided into three groups. The first group undergoes a drop test in which a battery cell is dropped from a height of 1.8 meters for 18 times. The second group undergoes a tumbling test in which a battery cell is tumbled for a distance of 0.5 meter for 2500 times. The third group undergoes a slight drop test in which a battery cell is slightly dropped for 4800 times and a high-temperature and high-humidity (HTHH) test. The following table shows the dimensions of the battery cells and corresponding test results in the embodiments.

TABLE 1

Dimensions of battery cells and corresponding test results in Embodiments 1 to 10 and Comparative Embodiment

| Embodiment | T2 (mm) | T1 (mm) | 0 < T2-T1 < 0.2 satisfied? | Z (mm) | (T2-Z)/2 ≤ R ≤ T1/2 + 0.3 satisfied? | 0.3 < D < 0.9 satisfied? | Pass of drop test, dropping from a height of 1.8 m for 18 times | Pass of tumbling test, tumbling for 0.5 m for 2500 times | Pass of slight drop test dropping for 4800 times, and HTHH test |
|---|---|---|---|---|---|---|---|---|---|
| Embodiment 1 | 5.173 | 5.153 | Yes | 2.752 | 2.3/Yes | No | All pass | All pass | All pass |
| Embodiment 2 | 5.082 | 5.024 | Yes | 2.798 | 2.358/Yes | No | All pass | All pass | All pass |
| Embodiment 3 | 5.122 | 5.002 | Yes | 2.145 | 1.723/Yes | No | All pass | All pass | All pass |
| Embodiment 4 | 5.155 | 5.002 | Yes | 2.155 | 1.797/Yes | Yes | All pass | All pass | All pass |
| Embodiment 5 | 5.124 | 5.108 | Yes | 2.356 | 2.21/Yes | Yes | All pass | All pass | All pass |
| Embodiment 6 | 5.129 | 5.094 | Yes | 2.636 | 2.236/Yes | Yes | All pass | All pass | All pass |
| Embodiment 7 | 5.237 | 5.204 | Yes | 1.841 | 2.71/Yes | Yes | All pass | All pass | All pass |
| Embodiment 8 | 5.257 | 5.204 | Yes | 1.703 | 2.83/Yes | Yes | All pass | All pass | All pass |
| Embodiment 9 | 3.846 | 3.832 | Yes | 2.57 | 1.82/Yes | Yes | All pass | All pass | All pass |
| Embodiment 10 | 4.533 | 4.497 | Yes | 1.587 | 1.3/No | Yes | All pass | All pass | All pass |
| Comparative Embodiment | 3.81 | 3.753 | Yes | 1.16 | 1.07/No | No | Failed by 2 battery cells | The first lateral edges of 2 battery cells flare out | The sealing position of the first lateral edges of 2 battery cells is broken, and the 2 battery cells fail due to expansion |

As can be seen from the table above, the battery cells that satisfy the condition of (T2−Z)/2≤R≤T1/2+0.3 specified according to embodiments of this application are free from lateral edge flaring, battery cell expansion, and housing breakage after undergoing the drop test in which a battery cell is dropped from a height of 1.8 meters for 18 times, the tumbling test in which a battery cell is tumbled for a distance of 0.5 meter for 2500 times, a slight drop test in which a battery cell is slightly dropped for 4800 times and an HTHH test. However, 2 of the battery cells designed according to the prior art fails the following tests: the drop test in which a battery cell is dropped from a height of 1.8 meters for 18 times, the tumbling test in which a battery cell is tumbled for a distance of 0.5 meter for 2500 times, a slight drop test in which a battery cell is slightly dropped for 4800 times, and an HTHH test. It is evident that the battery cells according to embodiments of this application not only increase the energy density of the battery cells, but also improve the safety performance of the battery cells.

Figure 4:
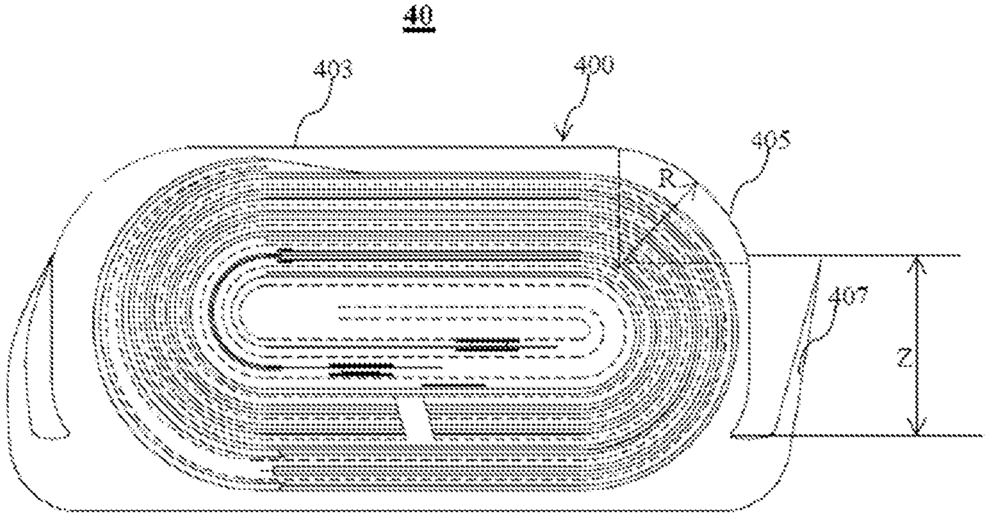
FIG. 4 is a schematic sectional view of a battery cell according to still another embodiment of this application.

FIG. 4 is a schematic sectional view of a battery cell 40 subjected to a slight drop test for 4800 times and an HTHH test according to the prior art. The battery cell 40 shown in FIG. 4 differs from the battery cell 10 shown in FIG. 1 only in that the radius R of the first lateral edge 405 of the housing 400 does not satisfy $(T2-Z)/2 \le R \le T1/2+0.3$, and the dimension Z of the second lateral edge 407 does not satisfy $0.2 \times T2 < Z < 0.8 \times T2$, where T1=3.753, T2=3.810, dimension Z=3.310, and R=2.350. After undergoing a slight drop for 4800 times and an HTHH test, the right-side second lateral edge 407 of the battery cell 40 is detached from the housing 400 of the battery cell 40, and the surface of the housing 400 is broken.

Therefore, embodiments of this application effectively improve the safety performance of the battery and also increase the energy density of the battery cell by improving the dimension of the housing of the battery cell and a dimensional relationship between the housing and the electrode assembly.

The technical content and technical features of this application have been disclosed above, but a person skilled in the art may still make various substitutions and modifications based on the teachings and disclosure of this application without departing from the spirit of this application. Therefore, the protection scope of this application is not limited to the content disclosed in the embodiments, but includes various substitutions and modifications made without departing from this application, and is covered by the claims of this patent application.

What is claimed is:

1. A battery cell comprising:

- an electrode assembly, wherein a thickness of the electrode assembly in a thickness direction of the battery cell is T1 mm; and
- a housing accommodating the electrode assembly; wherein the housing comprises:
- a first surface;
- a second surface opposite to the first surface, wherein a distance between the first surface and the second surface in the thickness direction is T2 mm;
- a first lateral edge with an arc shape and connected to the second surface, wherein a radius of the first lateral edge is R mm;
- a third surface connected to the first lateral edge and configured to enclose at least a part of a lateral face of the electrode assembly, wherein;
- the third surface comprises a first edge and a second edge opposite to each other along the thickness direction, direction, and
- the first edge of the third surface is connected to a lowest position of the first lateral edge in the thickness direction,
- a second lateral edge comprising a first part and a second part,
- the first part extends away from the electrode assembly, starting from a first edge of the first surface along a width direction of the battery cell and the second edge of the third surface along the thickness direction,
- the second part extends toward the electrode assembly,
- the second part possesses an ending edge,

- the ending edge is connected to the third surface,
- along the thickness direction, a distance between the second edge of the third surface and the ending edge is Z mm,
- along the width direction of the battery cell perpendicular to the thickness direction, a maximum distance between the second lateral edge and the electrode assembly is D mm,
- $(T2-Z)/2 \le R \le T1/2+0.3$, and
- $0.3 < D < 0.9$.

2. The battery cell according to claim 1, wherein the first lateral edge defines a sectoral region S with a radius being R mm, along the thickness direction, a height between the second edge of the third surface and the lowest position of the sectoral region S in the thickness direction is H mm, and $Z \le H$.

3. The battery cell according to claim 2, wherein $Z < 0.8$ T2.

4. The battery cell according to claim 3, wherein $0.2T2 < Z$.

5. The battery cell according to claim 1, wherein 0 mm<T2 mm−T1 mm<0.2 mm.

6. The battery cell according to claim 1, wherein the second lateral edge is a once-bent structure or a twice-bent structure, and at least a part of the second part fits the third surface hermetically.

7. The battery cell according to claim 1, wherein the electrode assembly is formed by winding a first electrode plate and a second electrode plate, and a separator is disposed between the first electrode plate and the second electrode plate.

8. The battery cell according to claim 7, wherein the battery cell further comprises an electrolytic solution located in the housing.

9. The battery cell according to claim 1, wherein the battery cell is a pouch-type cell.

10. The battery cell according to claim 1, wherein the second part further comprises an ending portion that is sealed by at least one of thermal bonding or adhesive.

11. An electronic device comprising a battery cell, wherein the battery cell comprises:

- an electrode assembly, wherein a thickness of the electrode assembly in a thickness direction is T1 mm; and
- a housing accommodating the electrode assembly; wherein the housing comprises:
- a first surface;
- a second surface opposite to the first surface, wherein a distance between the first surface and the second surface in the thickness direction of the battery cell is T2 mm;
- an arc-shaped first lateral edge connected to the second surface, wherein a radius of the first lateral edge is R mm;
- a third surface connected to the first lateral edge and configured to enclose at least a part of a lateral face of the electrode assembly, wherein:
- the third surface comprises a first edge and a second edge opposite to each other along the thickness direction,
- the first edge of the third surface is connected to a lowest position of the first lateral edge in the thickness direction,
- a second lateral edge comprising a first part and a second part,
- the first part extends away from the electrode assembly, starting from a first edge of the first surface along a width direction of the battery cell and the second edge of the third surface along the thickness direction,
- the second part extends toward the electrode assembly, the second part possesses an ending edge,
the ending edge is connected to the third surface,
along the thickness direction, a distance between the second edge and the ending edge is Z mm,
along the width direction of the battery cell perpendicular to the thickness direction, a maximum distance between the second lateral edge and the electrode assembly is D mm,
$(T2-Z)/2 \leq R \leq T1/2+0.3$, and
$0.3<D<0.9$.

12. The electronic device according to claim 11, wherein the first lateral edge defines a sectoral region S with a radius being R mm, along the thickness direction, a height between the second edge of the third surface and the lowest position of the sectoral region S in the thickness direction is H mm, and $Z \leq H$.

13. The electronic device according to claim 12, wherein $Z<0.8T2$.

14. The electronic device according to claim 13, wherein $0.2T2<Z$.

15. The electronic device according to claim 11, wherein 0 mm<T2 mm−T1 mm<0.2 mm.

16. The electronic device according to claim 11, wherein the second lateral edge is a once-bent structure or a twice-bent structure, and at least a part of the second part fits the third surface hermetically.

17. The electronic device according to claim 11, wherein the electrode assembly is formed by winding a first electrode plate and a second electrode plate, and a separator is disposed between the first electrode plate and the second electrode plate.

18. The electronic device according to claim 17, wherein the battery cell further comprises an electrolytic solution located in the housing.

19. The electronic device according to claim 11, wherein the battery cell is a pouch-type cell.

20. The electronic device according to claim 11, wherein the second part further comprises an ending portion that is sealed by at least one of thermal bonding or adhesive.

* * * * *